(12) United States Patent
Lawson et al.

(10) Patent No.: US 9,148,447 B2
(45) Date of Patent: Sep. 29, 2015

(54) SAFE SERVICES FRAMEWORK

(75) Inventors: Richard Lougheed Lawson, Huntersville, NC (US); William Earnest Kelley, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 574 days.

(21) Appl. No.: 13/222,055

(22) Filed: Aug. 31, 2011

(65) Prior Publication Data

US 2013/0054770 A1    Feb. 28, 2013

(51) Int. Cl.
*G06F 15/173*  (2006.01)
*H04L 29/06*  (2006.01)

(52) U.S. Cl.
CPC ..................... *H04L 63/20* (2013.01)

(58) Field of Classification Search
CPC .... H04L 63/08; H04L 2463/102; H04L 63/20
USPC ......... 709/203, 223; 726/1–6, 16–21; 705/64, 705/70–79
See application file for complete search history.

(56) References Cited

U.S. PATENT DOCUMENTS

| | | | |
|---|---|---|---|
| 6,647,376 B1 * | 11/2003 | Farrar et al. ................... | 705/45 |
| 7,080,048 B1 * | 7/2006 | Sines et al. ..................... | 705/75 |
| 7,536,548 B1 | 5/2009 | Batke et al. | |
| 7,668,776 B1 * | 2/2010 | Ahles .............................. | 705/38 |
| 8,280,776 B2 * | 10/2012 | Coulter et al. ................. | 705/16 |
| 2005/0080716 A1 * | 4/2005 | Belyi et al. ..................... | 705/38 |
| 2006/0161435 A1 * | 7/2006 | Atef et al. ...................... | 704/246 |
| 2008/0086759 A1 * | 4/2008 | Colson ............................ | 726/2 |
| 2009/0037332 A1 * | 2/2009 | Cheung et al. ................. | 705/42 |
| 2011/0238566 A1 * | 9/2011 | Santos ............................ | 705/38 |
| 2012/0231844 A1 * | 9/2012 | Coppinger .................... | 455/558 |

FOREIGN PATENT DOCUMENTS

| | | |
|---|---|---|
| WO | PCT/US12/50100 | 8/2012 |
| WO | PCT/US12/50110 | 8/2012 |

(Continued)

OTHER PUBLICATIONS

U.S. Appl. No. 13/209,935, filed Aug. 15, 2011, Radhakrishnan.

(Continued)

*Primary Examiner* — Duyen Doan
(74) *Attorney, Agent, or Firm* — Michael A. Springs

(57) ABSTRACT

Providing security-related services for enterprise service requests includes receiving a service request from an endpoint, determining the transaction parameter from the received service request, determining a subroutine for execution based on the transaction parameter, communicating with a data server to execute the subroutine, receiving subroutine results from the data server based on the executed subroutine, applying context-specific rules to the request based on instructive data specified in the subroutine results, determining a response based on the subroutine results and the applied context-specific rules, and communicating the response to the endpoint. Some embodiments may also include accessing transaction rules associated with the transaction parameter, determining an additional subroutine for execution based on the transaction rules, communicating with a data server to execute the additional subroutine, receiving additional subroutine results from the data server based on the executed additional subroutine, and communicating the results to the endpoint.

21 Claims, 2 Drawing Sheets

(56) References Cited

FOREIGN PATENT DOCUMENTS

| WO | PCT/US12/50227 | 8/2012 |
|---|---|---|
| WO | PCT/US12/50233 | 8/2012 |
| WO | PCT/US12/50237 | 8/2012 |
| WO | PCT/US12/50521 | 8/2012 |
| WO | PCT/US12/50537 | 8/2012 |
| WO | PCT/US12/50541 | 8/2012 |
| WO | PCT/US12/50547 | 8/2012 |
| WO | PCT/US12/50560 | 8/2012 |

OTHER PUBLICATIONS

U.S. Appl. No. 13/210,075, filed Aug. 15, 2011, Radhakrishnan.
U.S. Appl. No. 13/210,139, filed Aug. 15, 2011, Radhakrishnan.
U.S. Appl. No. 13/210,120, filed Aug. 15, 2011, Radhakrishnan.
U.S. Appl. No. 13/210,222, filed Aug. 15, 2011, Radhakrishnan.
U.S. Appl. No. 13/210,101, filed Aug. 15, 2011, Radhakrishnan.
U.S. Appl. No. 13/210,167, filed Aug. 15, 2011, Radhakrishnan.
U.S. Appl. No. 13/210,113, filed Aug. 15, 2011, Radhakrishnan.
U.S. Appl. No. 13/210,145, filed Aug. 15, 2011, Radhakrishnan.
U.S. Appl. No. 13/210,164, filed Aug. 15, 2011, Radhakrishnan.
U.S. Appl. No. 13/210,220, filed Aug. 15, 2011, Radhakrishnan.
U.S. Appl. No. 13/210,277, filed Aug. 15, 2011, Radhakrishnan.
U.S. Appl. No. 13/210,246, filed Aug. 15, 2011, Radhakrishnan.
U.S. Appl. No. 13/210,213, filed Aug. 15, 2011, Radhakrishnan.
U.S. Appl. No. 13/210,262, filed Aug. 15, 2011, Radhakrishnan.
U.S. Appl. No. 13/210,276, filed Aug. 15, 2011, Radhakrishnan.
U.S. Appl. No. 13/210,289, filed Aug. 15, 2011, Radhakrishnan.
U.S. Appl. No. 13/479,482, filed May 24, 2012, Radhakrishnan.
U.S. Appl. No. 13/479,489, filed May 24, 2012, Radhakrishnan.
U.S. Appl. No. 13/479,464, filed May 24, 2012, Radhakrishnan.
U.S. Appl. No. 13/479,516, filed May 24, 2012, Radhakrishnan.
U.S. Appl. No. 13/479,509, filed May 24, 2012, Radhakrishnan.
U.S. Appl. No. 13/479,560, filed May 24, 2012, Radhakrishnan.
U.S. Appl. No. 13/479,698, filed May 24, 2012, Radhakrishnan.
U.S. Appl. No. 13/479,498, filed May 24, 2012, Radhakrishnan.
U.S. Appl. No. 13/479,580, filed May 24, 2012, Radhakrishnan.
U.S. Appl. No. 13/479,667, filed May 24, 2012, Radhakrishnan.
U.S. Appl. No. 13/479,619, filed May 24, 2012, Radhakrishnan.
U.S. Appl. No. 13/479,616, filed May 24, 2012, Radhakrishnan.
U.S. Appl. No. 13/479,633, filed May 24, 2012, Radhakrishnan.
U.S. Appl. No. 13/479,491, filed May 24, 2012, Radhakrishnan.
U.S. Appl. No. 13/479,533, filed May 24, 2012, Radhakrishnan.
U.S. Appl. No. 13/479,554, filed May 24, 2012, Radhakrishnan.
U.S. Appl. No. 13/479,462, filed May 24, 2012, Radhakrishnan.
U.S. Appl. No. 13/479,452, filed May 24, 2012, Radhakrishnan.
U.S. Appl. No. 13/479,454, filed May 24, 2012, Radhakrishnan.
U.S. Appl. No. 13/479,480, filed May 24, 2012, Radhakrishnan.
*Protegrity Tokenization: Securing Sensitive Data for PCI, HIPAA and Other Data Security Initiatives*; 13 pages, Mar. 2011.

\* cited by examiner

SAFE SERVICES FRAMEWORK

TECHNICAL FIELD

This disclosure relates generally to providing security and, more specifically, to providing security-related services for enterprise service requests.

BACKGROUND

Enterprises receive service requests from various access channels. Enterprises may experience security-related threats via the various access channels, or in the form of unauthorized service requests. The need for security-related services may be particularly acute in certain business sectors, such as the banking industry. The level of security required may also depend on applicable standards, regulations, business needs, or the severity of the perceived threats.

SUMMARY

According to one embodiment, providing security-related services for enterprise service requests includes receiving a service request from an endpoint, determining the transaction parameter from the received service request, determining a subroutine for execution based on the transaction parameter, communicating with a data server to execute the subroutine, receiving subroutine results from the data server based on the executed subroutine, applying context-specific rules to the service request based on instructive data specified in the subroutine results, determining a response based on the subroutine results and the applied context-specific rules, and communicating the response to the endpoint.

In some embodiments, providing security-related services for enterprise service requests also includes accessing transaction rules associated with the transaction parameter, determining an additional subroutine for execution based on the transaction rules, communicating with a data server to execute the additional subroutine, receiving additional subroutine results from the data server based on the executed additional subroutine, and communicating the results to the endpoint.

Certain embodiments of the present disclosure may provide one or more technical advantages. A technical advantage of one embodiment includes consistently applying security, authentication, fraud prevention, and enrollment services to a variety of enterprise transactions and access channels using a flexible SAFE services module. In particular embodiments, using a SAFE services module provides a robust system that can be easily updated to be applied to new services and/or channels of access with minimal testing. Another technical advantage of an embodiment includes the ability to update the SAFE services module to address changing standards, regulations, business needs, or emerging risks. In addition, capabilities may be added, modified, or removed from the SAFE services system. Also, the rules used by the SAFE service module may be tailored to meet the shifting risk criteria of the enterprise. Yet another technical advantage of an embodiment includes leveraging the capabilities of various lines of businesses within an enterprise by interfacing with the appropriate service providers. Accordingly, capital investments made in one line of business can be advantageously leveraged by the other.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
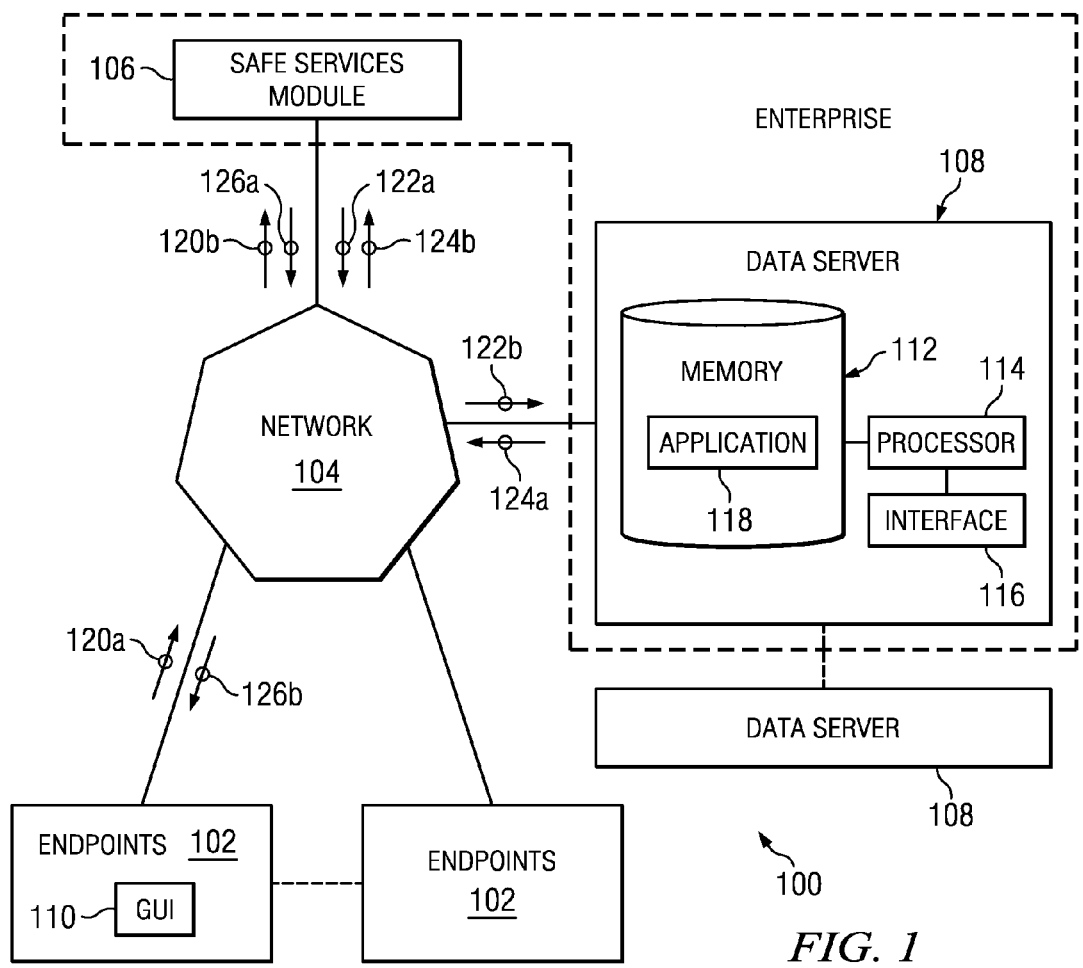
FIG. 1 illustrates an example environment for providing security-related services.
Figure 2:
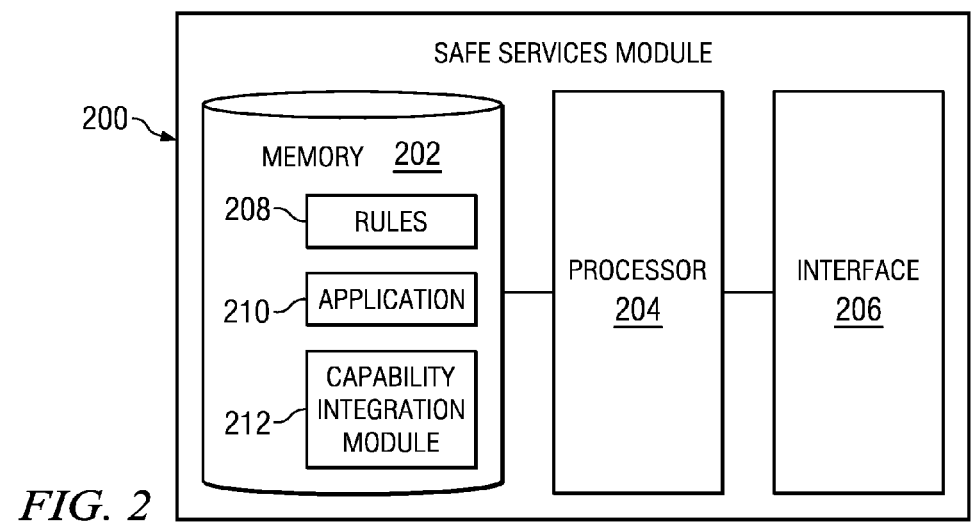
FIG. 2 illustrates an example embodiment of a security authentication, fraud prevention, and enrollment ("SAFE") services module.
Figure 3:
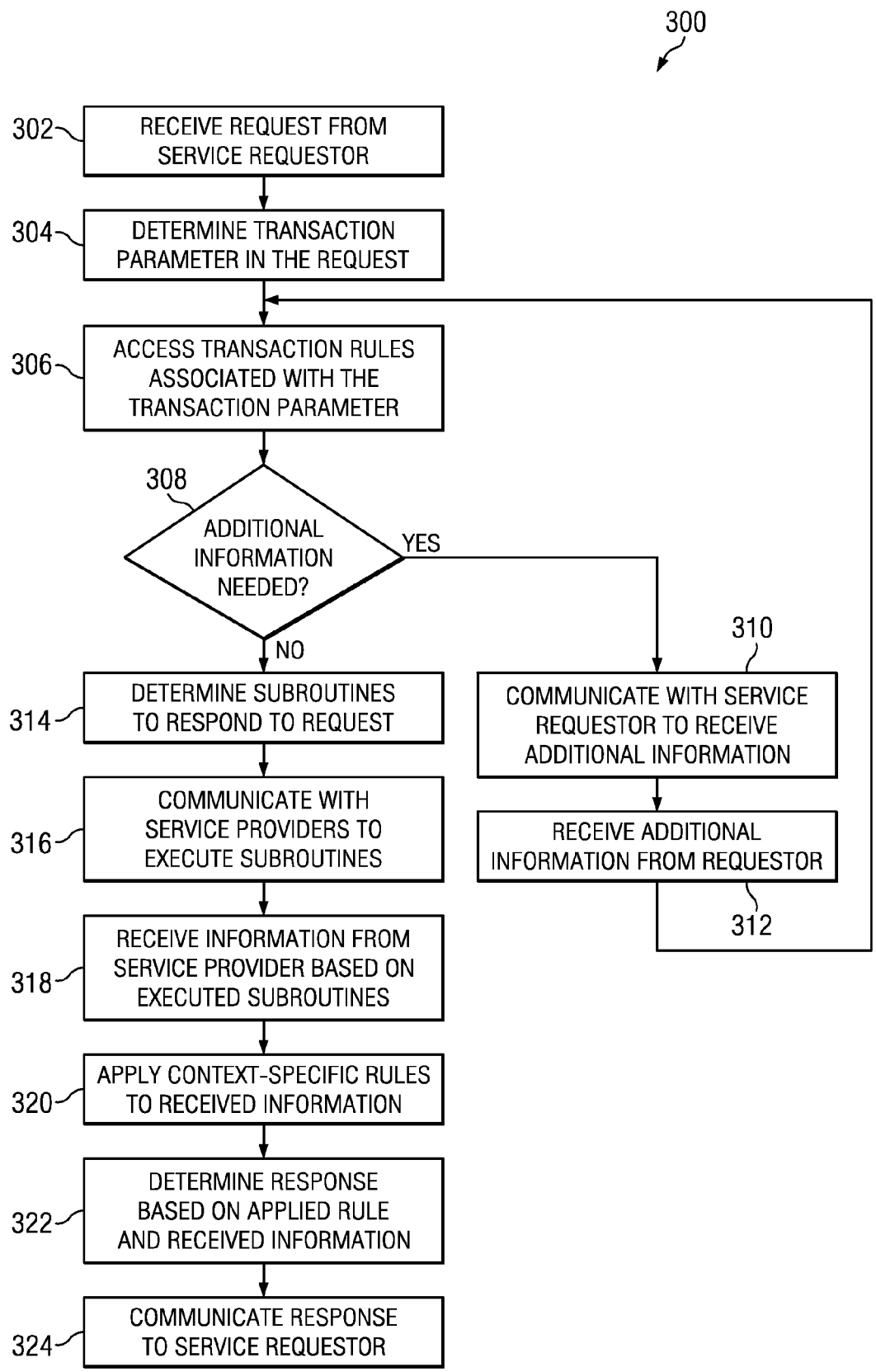
FIG. 3 illustrates a flow chart of an example embodiment for providing SAFE Services.

Embodiments of the present invention and its advantages are best understood by referring to FIGS. 1-3, like numerals being used for like and corresponding parts of the various drawings.

FIG. 1 illustrates an example environment for providing security-related services. System 100 that provides security, authentication, fraud, and enrollment ("SAFE") services. These features are typically executed prior to providing access to a particular service and can be independent of channel of access. For example, when a bank customer requests a particular bank transaction, the same collection of SAFE services may be executed regardless of whether the bank customer is accessing the system through a web browser, a mobile phone, or an automatic teller machine ("ATM"). Thus, the specific security, authentication, fraud, and enrollment processes that system 100 employs in response to a particular request may be the same regardless of the channel of access. In other embodiments, certain channels of access may require additional or fewer security, authentication, fraud, and enrollment processes based on anticipated security and/or fraud risks associated with the particular channel of access. System 100 includes one or more endpoints 102 that communicate over a network 104 to access certain sensitive services provided by an enterprise that require additional security-related processes to be executed in order to prevent unauthorized access to those sensitive services. Endpoints 102 may interact with SAFE services module 106 to conduct a number of processing activities. The SAFE services module 106 interacts with data servers 108 to perform appropriate processing based on the transaction and various rules.

SAFE services is the set of procedures and processes that facilitate secure access to enterprise services across different channels of access. For example, certain procedures and processes may be performed in response to a particular type of transaction request. In addition, certain rules may be performed based on the results of such procedures and processes. An enterprise may provide a variety of services to its customers that require layers of precautionary measures to be implemented in the form of security, authentication, fraud prevention, and enrollment services. These requirements may be defined by various regulatory standards or enterprise-specific policies. By providing a unified means for implementing SAFE services, an enterprise is able to flexibly adapt to changing regulations, standards, or policies by centrally changing the processes and rules associated with access to particular enterprise services without affecting the channels of access or SAFE services associated with other enterprise services. In addition to facilitating the adaptation of SAFE services for certain enterprise services, the system may also allow the association or disassociation of SAFE services with particular enterprise services. Accordingly, various embodiments of the SAFE service system provide enterprises with the flexibility to adapt to changing regulatory and business needs associated with various enterprise service offerings.

Endpoints 102 represent general purpose computers including appropriate hardware, control logic, and data that may be used to interface with other system components, such as SAFE services module 106 or data servers 108, using network 104. For example, endpoints 102 may represent work stations, laptops, netbooks, tablet computers, personal data assistants, (PDAs), mobile phones, banking centers, automatic teller machines (ATMs), customer service solution or any other suitable computing device. A customer service solution may be system, such as a call center, operable to receive, process, and provide individualized service to customers. For example, a customer may call into a particular customer service solution and interact with solution by responding to voice prompts using particular dial tones or voice responses to retrieve the customer's account information or conduct various transactions with respect to the customer's account. Endpoints 102 may support a wide array of operations, including but not limited to, web browsing, telephonic services, bank services and facilitating access to secure enterprise services. According to particular embodiments, endpoints 102 may provide access, potentially through web-based interfaces, to secure services through SAFE services module 106 and data servers 108. As illustrated, endpoints 102 may include a graphical user interface 110. Graphical user interface 110 represents any appropriate interface for receiving and displaying information to a user of system 100. Graphical user interface 110 may be any appropriate combination of hardware and/or software to facilitate a user's interaction with endpoints 102. Graphical user interface 110 may provide a different user interface based on the type of endpoint.

Network 104 represents any suitable communications network operable to facilitate communication between the components of system 100, such as endpoints 102, data servers 108, and SAFE services module 106. Network 104 may include any interconnecting system capable of transmitting audio/video signals, data, messages or any other combination of the preceding. Network 104 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between components of system 100. Network 104 may include any combination of gateways, routers, hubs, switches, access points, base stations, wireless telephone systems and any other hardware, software or combination thereof.

SAFE services module 106 represents suitable hardware components, control logic, and data for receiving enterprise service requests from endpoints 102, determining the appropriate processes and rules to implement various SAFE services based on the service request, and executing appropriate processes and subroutines by communicating with data servers 108. As illustrated, SAFE services module 106 may be communicatively coupled to other components of system 100, such as data servers 108 and endpoints 102, by a network 104. In particular embodiments, SAFE services module 106 may be operable to process the enterprise service requests, coordinate execution of appropriate SAFE services through communication with various data servers 108, and provide an indication of the results or provide access to the underlying enterprise service. In certain embodiments, SAFE services module 106 is capable of applying additional context-specific rules based on instructive data specified in the results from data servers 108. SAFE services module 106 will be discussed in further detail in FIG. 2.

Data servers 108 represent suitable hardware components, control logic, and data for implementing specific processes related to SAFE services. For example, data servers 108 may be any suitable combination of computer servers and networking devices, whether real or virtual. Data servers 108 may have appropriate applications and data for implementing a particular type of SAFE service. For example, certain data servers 108 may have appropriate applications and data for performing transaction authorization, authentication, enrollment, identity validation, and security on the device and channel. As shown, certain data servers 108 may be part of the enterprise while other data servers 108 may be controlled by third parties. In certain circumstances, maintaining access to third party data servers 108 allows the enterprise to make certain determinations based on information held by third parties. For example, determining whether a consumer can qualify for a credit card with a particular credit limit may require a credit check to be performed in real-time by a third-party. The enterprise may rely on a third party data server 108 to perform the credit check and return the results. Data servers 108 may include a number of applications expressed as various subroutines for implementing a particular type of SAFE service. Data servers 108 may receive requests from the SAFE services module 106 to execute specific subroutines and return the corresponding results of those subroutines. The results may contain additional instructions or criteria for applying context-specific rules by SAFE services module 106.

As illustrated, data servers 108 may include various interconnected elements including a memory 112, a processor 114, and an interface 116. Memory 112 represents any suitable combination of volatile or non-volatile, local or remote devices suitable for storing information. For example, memory 112 may include random access memory (RAM), read only memory (ROM), magnetic storage devices, optical storage devices, or any other suitable information storage device or a combination of such devices. Memory 112 may maintain appropriate control logic and rules for controlling the operation of data servers 108. As illustrated, memory 112 may include applications 118 for processing different types of requests. In particular embodiments, applications 118 represent executable code organized in subroutines for performing specific tasks related to SAFE services. For example, applications 118 may represent executable subroutines for performing various security-related operations, such as transaction authorization, authentication, enrollment, identity validation, or securing device and channel.

Processor 114 represents any hardware and/or software that communicatively couples to memory 112 and interface 116, and controls the operation and administration of data servers 108. For example, processor 114 may execute appropriate software to control the operation of data servers 108. Processor 114 may be a programmable logic device, a microcontroller, a microprocessor, any other appropriate processing device, or any suitable combination of the preceding.

Interface 116 represents any suitable device operable to receive information from network 104, transmit information through network 104, perform processing of received or transmitted information, communicate to other devices or any combination of the preceding. Interface 116 represents any port or connection real or virtual including any suitable hardware and/or software including protocol conversion and data processing capabilities to communicate through a LAN, WAN or other communication systems that allow data servers 108 to exchange information with network 104, endpoints 102 and SAFE services module 106. For example, interface 116 may receive requests from SAFE services module 106 for execution of specific subroutines residing in applications 118.

In particular embodiments, endpoints 102 communicate enterprise service request 120 to SAFE services module 106 through network 104. In response to request 120, SAFE services module 106 may determine various subroutines for one or more data servers 108 to execute based on various transaction rules and/or the type of enterprise service request. In particular embodiments, the type of the enterprise service request is specified in a transaction parameter. In some circumstances, SAFE services module 106 may require additional information from endpoints 102 and therefore communicate with endpoints 102 to obtain such additional information. Certain enterprise services may request additional information when security-related issue is suspected. As one example, when a user seeks access to an account that has been associated with fraud, additional challenges may be issued to the user to authenticate the user as the account holder. Next, SAFE services module 106 may issue a request 122 to one or more data servers 108 to execute specific subroutines residing in applications 118. In response to request 122, data servers 108 may issue a response 124 including the results of the executed subroutines. In some cases, the results may include additional instructions or criteria for SAFE services module 106 to apply context-specific rules and/or perform other processing.

In exemplary embodiments, SAFE services module 106 receives the response 126, which includes the results of the executed subroutines, including any additional instructions or criteria. SAFE services module 106 may apply context-specific rules based on any additional instructions or criteria. For example, a credit check of a prospective credit card consumer falling within a less than ideal range may trigger a series of context-specific rules to be evaluated to determine whether other criteria militates in favor of nevertheless granting the prospective consumer enrollment to requested credit card services. Next, SAFE services module 106 may issue response 126 to endpoints 102. Response 126 may include the results received from the appropriate data servers 108 and/or the final result of applying the context-specific rules. In certain embodiments, response 126 may link endpoint 102 to the requested enterprise service if SAFE services module 106 has determined that the endpoint 102 is authorized to access the enterprise service.

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 100 and the components within system 100.

While system 100 is illustrated as including specific components arranged in a particular configuration, it should be understood that various embodiments may operate using any suitable arrangement and collection of components capable of providing functionality such as that described.

FIG. 2 illustrates a system 200 as a particular embodiment of a SAFE services module 106 that receives enterprise service requests and processes the requests according to particular control logic. In a particular embodiment, system 200 represents a proprietary Bank of America SAFE services module that facilitates the application of security, authentication, fraud prevention, and enrollment layers to enterprise service requests. As illustrated, system 200 may include various interconnected elements including a memory 202, a processor 204, and an interface 206.

Memory 202 stores, either permanently or temporarily, data, operational software, or other information for processor 204. Memory 202 represents any suitable combination of volatile or non-volatile, local or remote devices suitable for storing information. For example, memory 202 may include RAM, ROM, magnetic storage devices, optical storage devices, or any other suitable information storage device or a combination of such devices. As illustrated, memory 202 includes rules 208, application 210, and capability integration module 212 to facilitate processing of enterprise service requests. Rules 208 may represent transaction rules and context-specific rules to determine the appropriate treatment of enterprise service requests and results from various data servers 108. In particular embodiments, rules 208 may be a database capable of storing transaction rules and context-specific rules.

Transaction rules specify various criteria for determining whether certain additional processes need to be performed for a given transaction. For example, if the amount of a transaction exceeds a specific dollar amount, a request to transfer that amount from one account to another may involve additional verification of the customer and of the source and destination accounts. Transaction rules can be tailored to meet changing standards or risk criteria. As one example, the specific dollar amount that triggers additional verification may be raised or lowered based on the customer's credit score, tenure as a customer, or other appropriate criteria. Context-specific rules specify various criteria for facilitating the enterprise service request after results have been received from data servers 108. As discussed above, even though data servers 108 indicate, for example, that a customer has a less than ideal credit score, the results may contain instructions or other data that indicate that additional processing needs to be done to determine whether the customer should nevertheless be granted authorization. In certain embodiments, such criteria and additional processing is specified in the context-specific rules.

Application 210 generally refers to logic, rules, algorithms, code, tables and/or other suitable instructions for performing the described functions and operations of system 200. In certain embodiments, application 210 may facilitate the interaction of system 200 with data servers 108 and endpoints 102 using network 104. For example, application 210 may facilitate initial processing of enterprise service requests, determine corresponding capabilities of capability integration module 212, control capability integration module 212, coordinate interactions between rules 208 and capability integration module 212, and/or determine appropriate responses for endpoints 102. In certain embodiments, application 210 may also facilitate requesting and receiving additional information from endpoints 102.

Capability integration module 212 generally refers to logic, rules, standards, policies, limitations, tables, and/or other suitable instructions for processing different types of enterprise service requests from endpoints 102. Capability integration module 212 may include logic to process the enterprise service request based on transaction parameters, such as the source of the request, the identity of the requestor, the type of endpoint, or other appropriate parameters. In certain embodiments, capability integration module 212 may be controlled by application 210 based on the received enterprise service request. For example, capability integration module 212 may various types of capabilities that correspond to different types of requests and/or the application of particular rules from rules 208. Possible capabilities may include capabilities related to security, authentication, fraud-prevention, enrollment, and encryption. Capabilities may also include specific capabilities that may be executed depending on the satisfaction of particular transaction rules or context-specific rules of rules 208. In particular embodiments, the number and variety of capabilities of capability integration module 212 may be modified to meet changing business requirements, standards, or emerging security threats.

Each capability of capability integration module 212 may communicate with one or more data servers, such as data servers 108, to perform the specific capability. For example, authenticating a user for a particular transaction may involve verifying the customer's user identifier, password, and type of endpoint. In particular implementations, while authenticating a user may be considered a high-order capability, verifying each credential (i.e., user identifier, password, endpoint type) may require corresponding communications to appropriate data servers 108. When a capability of capability integration module 212 requests a task to be performed by one or more data servers 108, each data server 108 may execute appropriate subroutines to perform the task and respond with the results. In particular embodiments, capability integration module 212 may be modified to meet changing business requirements, standards, or emerging security threats by modifying the tasks to be performed for the capability and/or redirecting the tasks to different data servers 108. Accordingly, capability integration module 212 provides distinct capabilities and facilitates the addition, deletion, or modification of capabilities as business needs evolve.

Processor 204 represents any hardware and/or software that communicatively couples to memory 202 and interface 206, and controls the operation and administration of system 200. For example, processor 204 may execute appropriate instructions, control logic, and rules in application 210 to control the operation of system 200. According to particular embodiments, processor 204 may be a programmable logic device, a microcontroller, a microprocessor, any other appropriate processing device, or any suitable combination of the preceding.

Interface 206 represents any suitable device operable to receive information from a communication network, such as network 104, transmit information on the network, perform processing of received or transmitted information, communicate with other devices, or any combination of the preceding. Interface 206 may be any port or connection real or virtual including any suitable hardware and/or software including protocol conversion and data processing capabilities to communicate through a LAN, WAN or other communication systems that allow system 200 to exchange information with other devices over a communication network. For example, interface 206 may enable system 200 to communicate with other devices and systems such as endpoints 102 and data servers 108 over network 104. In some embodiments, interface 206 may receive enterprise service requests for processing by processor 204 and using application 210, rules 208, and capability integration module 212 of memory 202. According to particular embodiments, interface 206 may facilitate communication with multiple data servers 108 and/or endpoints 102 to perform specific subroutines associated with the capabilities supported by system 200 for providing SAFE services. Following processing by system 200, interface 206 may communicate responses to endpoints 102.

In operation, processor 204 interacts with interface 206 to receive enterprise service requests from endpoints 102. As described above, the enterprise server requests may originate from various types of endpoints 102. In some instances, the enterprise service request may identify the type of endpoint. Once the enterprise server request is received by interface 206, processor 204 may execute specific control logic defined by application 210 to determine the appropriate rules 208 and/or capabilities of capability integration module 212 to execute to facilitate processing of the enterprise server request. In particular embodiments, processor 204 may apply transaction rules to the enterprise service request. For example, a particular transaction rule may evaluate whether the transaction associated with the enterprise service request exceeds one thousand dollars. In the cases where the transaction exceeds this amount, processor 204 may execute control logic in application 210 and coordinate with capability integration module 212 to perform additional risk analysis or authentication of the transaction. Such transaction rules of rules 208 may be configurable based on changing business needs and risk criteria.

Next, processor 204 may determine the appropriate capabilities to process the enterprise service requests using capability integration module 212. Using interface 206, system 200 may communicate with one or more data servers 108 to execute various subroutines to implement the desired capability. In response, system 200 may receive subroutine results from data servers 108. In some embodiments, the results may include instructive data that require additional rules to be executed. For example, applying context-specific rules to the instructions or data embodied in the results may trigger additional subroutines by certain data servers 108 to be executed. As discussed above, a credit check for a prospective credit card consumer falling within a less than ideal range may trigger a series of configurable context-specific rules to be evaluated to determine whether the satisfaction of other criteria nevertheless warrants granting the prospective consumer enrollment to the requested credit card services. In some embodiments, system 200 may communicate with endpoints 102 after receiving an enterprise service request to obtain additional information for processing the requests. For example, for an endpoint 102 seeking authentication, system 200 may require additional customer information in the form of challenges (e.g., mother's maiden name, favorite color, zip code or other appropriate information). Accordingly, system 200 may advantageously interact with endpoints 102 and data servers 108 to provide SAFE services for various transactions.

While system 200 is illustrated as including specific components arranged in a particular configuration, it should be understood that various embodiments may operate using any suitable arrangement and collection of components capable of providing functionality such as that described.

FIG. 3 illustrates a flow chart 300 for processing enterprise service requests according to certain embodiments of the present disclosure. In operation, the process depicted in flow chart 300 begins at step 302 when an enterprise service request is received from a service requestor. In particular implementations, an enterprise service request may be received from endpoints 102 using network 104. The service request may include various transaction parameters such as the source of the request, the device type, and/or other appropriate parameters corresponding to the transaction. Next in step 304, the SAFE services module determines the transaction parameters in the request. Based on the transaction parameters in the request, the SAFE services module may access specific transaction rules in step 306. For example, a transaction exceeding a particular dollar value may cause certain transaction rules to be applied.

In step 308, the SAFE services module determines whether additional information is needed, and communicates with the requestor to receive additional information in steps 310-312. After any additional information is received in step 312, any appropriate transaction rules may be accessed and may be applied to the additional information. In step 314, the SAFE services module determines the subroutines to respond to the request. In certain embodiments, this involves accessing specific capabilities within capability integration module 212 to determine the data servers 108 to communicate with to execute the various subroutines. As discussed above, the SAFE services module may provide capabilities such as security, authentication, fraud prevention, and enrollment services for a variety of enterprise transactions. This step may also involve evaluating rules before certain capabilities or subroutines are executed.

Once the appropriate subroutines are determined, SAFE services module communicates with the corresponding service providers to execute the determined subroutines in step 316. In certain implementations, this involves transmitting requests to appropriate data servers 108 for execution of the determined subroutines. The service providers and corresponding data servers 108 may be part of the enterprise (e.g., a line of business within the enterprise), or in some cases, outside the enterprise. For example, the SAFE services module may rely on data servers from third party credit verification agencies to obtain credit reports on prospective customers. In step 318, the SAFE services module receives the results from the executed subroutines. In certain embodiments, the results may indicate either approval or denial. In other embodiments, the results may contain instructive data that requires further evaluation. For example, context-specific rules may be applied to such data in step 320 to determine whether other evaluations need to be made and/or other subroutines executed. In some instances, this may involve assessing whether additional criteria are met despite the results received in step 318. In step 322, the SAFE services module formulates a response for the user based on the results received in step 318, and/or any applied context-specific rules in step 320. Finally, in step 324, the response is communicated to the requesting endpoint 102 using any appropriate communication medium such as network 104.

While flow chart 300 is illustrated as including specific steps arranged in a particular sequence, it should be understood that various embodiments may operate using suitable arrangement and collection of steps capable of providing functionality such as that described. Accordingly, modifications, additions, or omissions may be made to flow chart 300 as appropriate.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Certain embodiments of the present disclosure may provide one or more technical advantages. A technical advantage of one embodiment includes consistently applying security, authentication, fraud prevention, and enrollment services to a variety of enterprise transactions and access channels using a flexible SAFE services module. In particular embodiments, using a SAFE services module provides a robust system that can be easily updated to be applied to new services and/or channels of access with minimal testing. Another technical advantage of an embodiment includes the ability to update the SAFE services module to address changing standards, regulations, business needs, or emerging risks. In addition, capabilities may be added, modified, or removed from the SAFE services system. Also, the rules used by the SAFE service module may be tailored to meet the shifting risk criteria of the enterprise. Yet another technical advantage of an embodiment includes leveraging the capabilities of various lines of businesses within an enterprise by interfacing with the appropriate service providers. Accordingly, capital investments made in one line of business can be advantageously leveraged by the other.

Although the present disclosure has been described in detail, it should be understood that various changes, substitutions, and alterations can be made hereto without departing from the scope of the invention as defined by the appended claims.

What is claimed is:

1. An apparatus, comprising:
   an interface receives a service request directly from an endpoint, wherein the service request comprises a transaction parameter;
   a memory stores transaction rules corresponding to at least one type of service request; and
   a processor communicatively coupled to the interface, the processor to:
   determine the transaction parameter from the received service request; determine a plurality of subroutines for execution based on the transaction parameter, the plurality of subroutines comprising a first subroutine and a second subroutine;
   communicate a request to each of a plurality of data servers, the plurality of data servers comprising a first data server and a second data server, the first data server executing the first subroutine and the second data server executing the second subroutine and the first subroutine and the second subroutine are different;
   receive subroutine results from the plurality of data servers, the plurality of data servers configured to perform a transaction authorization subroutine, an authentication subroutine, an enrollment subroutine, an identity validation subroutine, and a securing device and channel subroutine, wherein the transaction authorization subroutine facilitates transferring funds between bank accounts, the authentication subroutine facilitates fraud prevention, the enrollment subroutine comprises a credit cheek, and the identity validation subroutine facilitates validating the identity of a user of the endpoint; when the subroutine results do not include at least one of an approval of the service request and a denial of the service request, apply context-specific rules to the service request based on instructive data specified in the subroutine results, the subroutine results comprising the instructive data;
   determine a response based on the subroutine results and the applied context-specific rules; and
   communicate the response to the endpoint.

2. An apparatus of claim 1, wherein the processor is further operable to:
   access transaction rules associated with the transaction parameter;
   determine an additional subroutine for execution based on the transaction rules;
   communicate with a data server to execute the additional subroutine;

receive additional subroutine results from the data server based on the executed additional subroutine; and
communicate the results to the endpoint.

3. An apparatus of claim 2, wherein determining an additional subroutine for execution based on the transaction rules comprises:
   determining that the transaction parameter corresponds to a transaction rule; and
   identifying the additional subroutine that is associated with the transaction rule for execution by the data server.

4. An apparatus of claim 1, wherein determining a response based on the subroutine results and the applied context-specific results comprises:
   determining that the received information matches one of the context-specific rules; and
   creating the response based on the matched context-specific rule.

5. An apparatus of claim 4, wherein creating a response based on the matched context-specific rule comprises:
   communicating with a second data server to execute an additional subroutine;
   receiving the additional subroutine results from the additional subroutine; and
   populating the response based on the received additional subroutine results.

6. An apparatus of claim 1, wherein the processor is further operable to:
   determine whether additional data is required from the endpoint;
   communicate with the endpoint to request the additional data; and
   receive the requested additional data from the endpoint.

7. An apparatus of claim 6, wherein the processor is further operable to receive an indication from the data server executing the subroutine that the additional data is required from the endpoint to process the service request.

8. A method, comprising:
   receiving a service request directly from an endpoint, wherein the service request comprises a transaction parameter; and
   storing transaction rules corresponding to at least one type of service request; and
   using a processor to:
      determine the transaction parameter from the received service request;
      determine a plurality of subroutines for execution based on the transaction parameter, the plurality of subroutines comprising a first subroutine and a second subroutine;
      communicate a request to each of a plurality of data servers, the plurality of data servers comprising a first data server and a second data server, the first data server executing the first subroutine and the second data server executing the second subroutine and the first subroutine and the second subroutine are different;
      receive subroutine results from the plurality of data servers, the plurality of data servers configured to perform a transaction authorization subroutine, an authentication subroutine, an enrollment subroutine, an identity validation subroutine, and a securing device and channel subroutine, wherein the transaction authorization subroutine facilitates transferring funds between bank accounts, the authentication subroutine facilitates fraud prevention, the enrollment subroutine comprises a credit check, and the identity validation subroutine facilitates validating the identity of a user of the endpoint;
      when the subroutine results do not include at least one of an approval of the service request and a denial of the service request, apply context-specific rules to the service request based on instructive data specified in the subroutine results, the subroutine results comprising the instructive data;
      determine a response based on the subroutine results and the applied context-specific rules; and
      communicate the response to the endpoint.

9. A method of claim 8, further comprising using the processor to:
   access transaction rules associated with the transaction parameter;
   determine an additional subroutine for execution based on the transaction rules;
   communicate with a data server to execute the additional subroutine;
   receive additional subroutine results from the data server based on the executed additional subroutine; and
   communicate the results to the endpoint.

10. A method of claim 9, wherein determining an additional subroutine for execution based on the transaction rules comprises:
    determining that the transaction parameter corresponds to a transaction rule; and
    identifying the additional subroutine that is associated with the transaction rule for execution by the data server.

11. A method of claim 8, wherein determining a response based on the subroutine results and the applied context-specific results comprises:
    determining that the received information matches one of the context-specific rules; and
    creating the response based on the matched context-specific rule.

12. A method of claim 11, wherein creating a response based on the matched context-specific rule comprises:
    communicating with a second data server to execute an additional subroutine;
    receiving the additional subroutine results from the additional subroutine; and
    populating the response based on the received additional subroutine results.

13. A method of claim 8, wherein the processor is further operable to:
    determine whether additional data is required from the endpoint;
    communicate with the endpoint to request the additional data; and
    receive the requested additional data from the endpoint.

14. A method of claim 13, wherein the processor is further operable to receive an indication from the data server executing the subroutine that the additional data is required from the endpoint to process the service request.

15. A non-transitory computer-readable medium comprising logic, the logic operable, when executed by a processor to:
    receive a service request directly from an endpoint, wherein the service request comprises a transaction parameter;
    store transaction rules corresponding to at least one type of service request;
    determine the transaction parameter from the received service request;

determine a plurality of subroutines for execution based on the transaction parameter, the plurality of subroutines comprising a first subroutine and a second subroutine;

communicate a request to each of a plurality of data servers, the plurality of data servers comprising a first data server and a second data server, the first data server executing the first subroutine and the second data server executing the second subroutine and the first subroutine and the second subroutine are different;

receive subroutine results from the plurality of data servers, the plurality of data servers configured to perform a transaction authorization subroutine, an authentication subroutine, an enrollment subroutine, an identity validation subroutine, and a securing device and channel subroutine, wherein the transaction authorization subroutine facilitates transferring funds between bank accounts, the authentication subroutine facilitates fraud prevention, the enrollment subroutine comprises a credit check, and the identity validation subroutine facilitates validating the identity of a user of the endpoint;

when the subroutine results do not include at least one of an approval of the service request and a denial of the service request, apply context-specific rules to the service request based on instructive data specified in the subroutine results, the subroutine results comprising the instructive data;

determine a response based on the subroutine results and the applied context-specific rules; and communicate the response to the endpoint.

16. A non-transitory computer-readable medium of claim 15, wherein the logic is further operable, when executed by a processor to:

access transaction rules associated with the transaction parameter;

determine an additional subroutine for execution based on the transaction rules;

communicate with a data server to execute the additional subroutine;

receive additional subroutine results from the data server based on the executed additional subroutine; and communicate the results to the endpoint.

17. A non-transitory computer-readable medium of claim 16, wherein determining an additional subroutine for execution based on the transaction rules comprises:

determining that the transaction parameter corresponds to a transaction rule; and identifying the additional subroutine that is associated with the transaction rule for execution by the data server.

18. A non-transitory computer-readable medium of claim 15, wherein determining a response based on the subroutine results and the applied context-specific results comprises:

determining that the received information matches one of the context-specific rules; and creating the response based on the matched context-specific rule.

19. A non-transitory computer-readable medium of claim 18, wherein creating a response based on the matched context-specific rule comprises:

communicating with a second data server to execute an additional subroutine;

receiving the additional subroutine results from the additional subroutine; and populating the response based on the received additional subroutine results.

20. A non-transitory computer-readable medium of claim 15, wherein the logic is further operable, when executed by a processor to:

determine whether additional data is required from the endpoint;

communicate with the endpoint to request the additional data; and receive the requested additional data from the endpoint.

21. An apparatus of claim 20, wherein the logic is further operable, when executed by a processor to receive an indication from the data server executing the subroutine that the additional data is required from the endpoint to process the service request.

* * * * *